US012649379B2

(12) United States Patent
Kim

(10) Patent No.:　US 12,649,379 B2
(45) Date of Patent:　Jun. 9, 2026

(54) APPARATUS FOR CONTROLLING VEHICLE, METHOD FOR CONTROLLING CHARGING OF VEHICLE, AND SYSTEM FOR CHARGING VEHICLE

(71) Applicants: Hyundai Motor Company, Seoul (KR); Kia Corporation, Seoul (KR)

(72) Inventor: Young Sik Kim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 993 days.

(21) Appl. No.: 17/835,263

(22) Filed: Jun. 8, 2022

(65) Prior Publication Data

US 2023/0141675 A1　May 11, 2023

(30) Foreign Application Priority Data

Nov. 5, 2021　(KR) ........................ 10-2021-0151748

(51) Int. Cl.
*B60L 53/62*　(2019.01)
*B60L 53/18*　(2019.01)
*B60L 58/27*　(2019.01)

(52) U.S. Cl.
CPC ............... *B60L 53/62* (2019.02); *B60L 53/18* (2019.02); *B60L 58/27* (2019.02)

(58) Field of Classification Search
CPC .......... B60L 53/62; B60L 53/18; B60L 58/27; B60L 53/66; B60L 58/12; B60L 53/16; B60L 53/665; B60L 58/10
See application file for complete search history.

(56) References Cited

U.S. PATENT DOCUMENTS

| | | | |
|---|---|---|---|
| 11,738,655 B2 | 8/2023 | Ando | |
| 2015/0375633 A1* | 12/2015 | Masuda | ................... B60L 58/21 |
| | | | 320/109 |
| 2019/0023130 A1* | 1/2019 | Garcha | ............. B60W 50/0098 |
| 2023/0067233 A1* | 3/2023 | Noh | ......................... B60L 53/12 |
| 2023/0174300 A1* | 6/2023 | Flynn | ...................... B60L 58/14 |
| 2025/0112475 A1* | 4/2025 | Malik | ..................... B60L 53/60 |

FOREIGN PATENT DOCUMENTS

| | | |
|---|---|---|
| JP | 2011238428 A | 11/2011 |
| JP | 2018186613 A | 11/2018 |
| JP | 2018196248 A | 12/2018 |
| JP | 2021125933 A | 8/2021 |
| KR | 102149186 B1 | 8/2020 |
| KR | 102317756 B1 | 10/2021 |

* cited by examiner

*Primary Examiner* — David V Henze
(74) *Attorney, Agent, or Firm* — Slater Matsil, LLP

(57)　ABSTRACT

An embodiment vehicle control apparatus includes a memory, a network interface, and a processor, wherein the processor is configured to recognize that a charging cable is connected to a vehicle, receive a charging end time of a preceding vehicle and a waiting time until charging of the vehicle starts, wait for the charging in a state in which charging cable is connected to the vehicle, and start the charging at the charging end time indicating that the charging of the preceding vehicle is ended in the state in which the charging cable is connected to the vehicle.

20 Claims, 5 Drawing Sheets

APPARATUS FOR CONTROLLING VEHICLE, METHOD FOR CONTROLLING CHARGING OF VEHICLE, AND SYSTEM FOR CHARGING VEHICLE

CROSS-REFERENCE TO RELATED APPLICATIONS

This application claims the benefit of Korean Patent Application No. 10-2021-0151748, filed on Nov. 5, 2021, which application is hereby incorporated herein by reference.

TECHNICAL FIELD

The present disclosure relates to a vehicle control apparatus, a method for controlling charging of a vehicle, and a system for charging a vehicle.

BACKGROUND

Recently, electric vehicles that are driven by charging a battery among vehicles is increasing. Such electric vehicles may be charged at charging stations where chargers are installed.

SUMMARY

The present disclosure relates to a vehicle control apparatus, a method for controlling charging of a vehicle, and a system for charging a vehicle. Particular embodiments relate to a technology capable of reducing a waiting time for charging a vehicle.

Embodiments of the present disclosure can solve problems occurring in the prior art while advantages achieved by the prior art are maintained intact.

When a vehicle arrives at a charging station, and when the charger installed at the charging station is charging another electric vehicle, the vehicle may be moved to another charging station to charge the vehicle, or may wait until the charging of another electric vehicle is ended.

When a vehicle battery is discharged, it is difficult for the electric vehicle to move or it may not be easy for the electric vehicle to move to another charging station because the vehicle battery may be discharged and stopped while the vehicle is moving. It may take a long time, up to an hour or more, when the vehicle waits until the charging of another electric vehicle is ended to charge the vehicle.

In addition, when the vehicle waits until the charging of another electric vehicle is ended to charge the vehicle, a long time may elapse with a vehicle's ignition turned off (IG Off). When a long time elapses while the vehicle's ignition is turned off, the temperature of the vehicle battery may decrease. When the temperature of the vehicle battery decreases, the charging performance of the vehicle battery may decrease, so that the time for charging the vehicle may increase.

An embodiment of the present disclosure reduces the waiting time for charging a vehicle without moving to another charging station even when a charger installed in a charging station is charging another electric vehicle.

In addition, an embodiment of the present disclosure reduces the time for charging a vehicle even when waiting until charging of another electric vehicle is ended.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, the vehicle control apparatus includes a memory, a network interface, and a processor. The processor is configured to recognize that a charging cable is connected, to receive a charging end time of a preceding vehicle and a waiting time until charging starts, to wait for the charging in a state in which the charging cable is connected to a vehicle, and to start the charging at an end time indicating that the charging of the preceding vehicle is ended in the state in which the charging cable is connected to the vehicle.

In an embodiment, the processor may receive a notification at the end time.

In an embodiment, the processor may perform a preliminary control in accordance with the charging end time of the preceding vehicle.

In an embodiment, the preliminary control may include an operation of increasing a charging performance of a vehicle battery.

In an embodiment, the preliminary control may include an operation of increasing the temperature of the vehicle battery up to a temperature in a state in which a vehicle's ignition is turned on (IG On) in accordance with the charging end time of the preceding vehicle.

In an embodiment, the processor may receive vehicle information including a charging time, a charging charge, and a drivable distance at at least one of a time when the charging starts and a time when the charging ends.

In an embodiment, the processor may receive a stop command indicating to stop the charging from a user irrespective of receiving the vehicle information.

According to an embodiment of the present disclosure, a method of controlling charging of a vehicle includes recognizing, by a processor of a vehicle control apparatus, that a charging cable is connected, receiving, by the processor, a charging end time of a preceding vehicle and a waiting time until charging starts, waiting for the charging in a state in which the charging cable is connected to a vehicle, and starting the charging at an end time indicating that the charging of the preceding vehicle is ended in the state in which the charging cable is connected to the vehicle.

According to an embodiment of the present disclosure, a vehicle charging system includes a charger including a plurality of charging cables, and a plurality of vehicles, and the charger is configured to proceed charging by allowing a first charging cable of the plurality of charging cables to be connected to a preceding vehicle among the plurality of vehicles, to allow a second charging cable of the plurality of charging cables to be connected to a following vehicle while the charging of the preceding vehicle is proceeded, to transmit a charging end time of the preceding vehicle and a waiting time until charging starts to the following vehicle, to wait for the charging in a state in which the second charging cable is connected to the following vehicle, and to start the charging with respect to the following vehicle at an end time indicating that the charging of the preceding vehicle is ended in the state in which the second charging cable is connected to the following vehicle.

In an embodiment, the charger may exclusively charge the preceding vehicle during the charging of the preceding vehicle.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
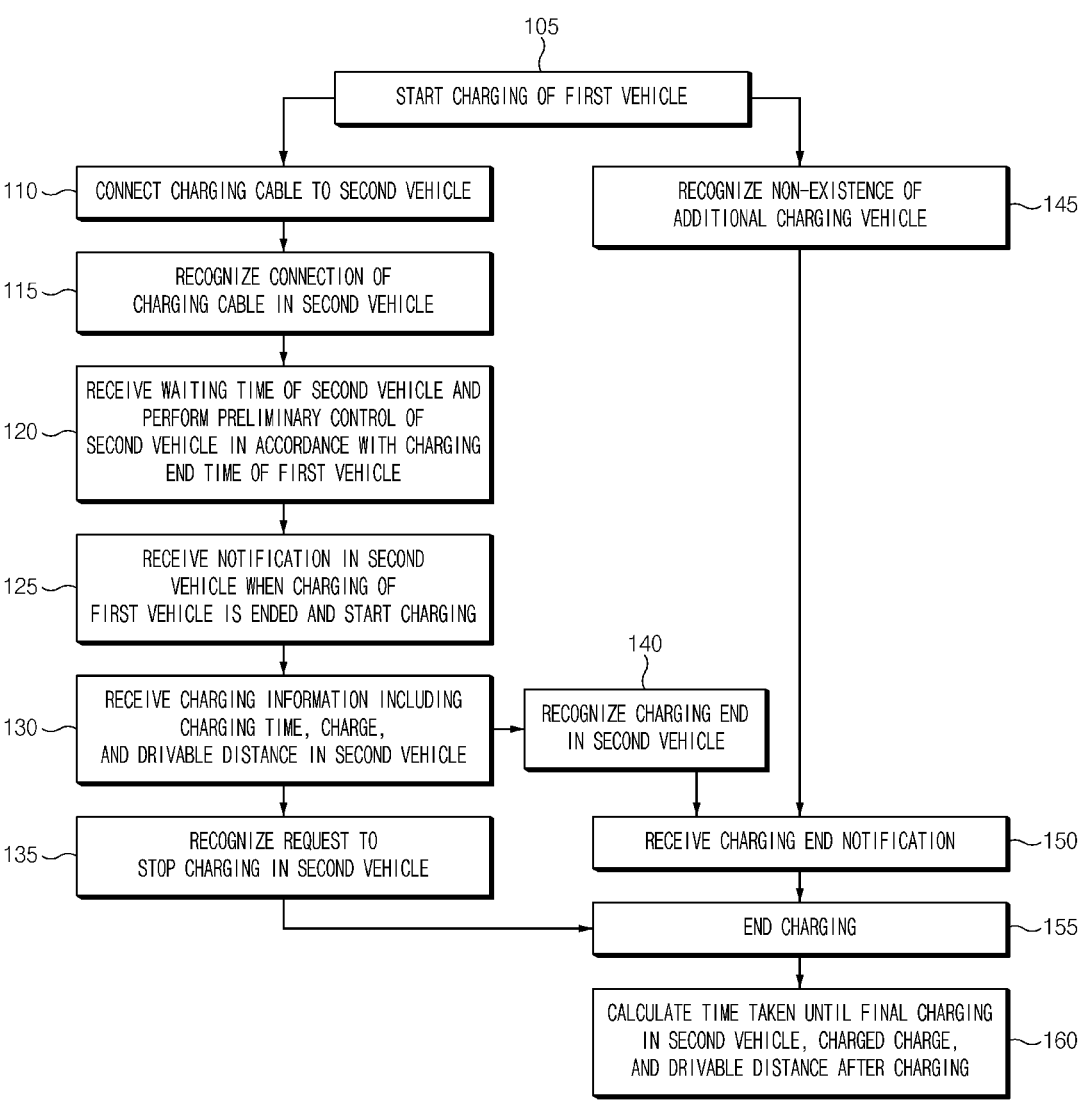
FIG. 1 is a flowchart illustrating how a vehicle control apparatus controls charging of a vehicle, according to an embodiment of the present disclosure.

Hereinafter, some embodiments of the present disclosure will be described in detail with reference to the drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various embodiments of the present disclosure will be described in detail with reference to FIGS. 1 to 4.

Hereinafter, it is assumed that a vehicle control apparatus performs a process of FIG. 1. In addition, in a description of FIG. 1, it may be understood that an operation described as being performed by a vehicle control apparatus is controlled by a processor (e.g., a processor 1100 in FIG. 5) of the vehicle control apparatus.

FIG. 1 is a flowchart illustrating how a vehicle control apparatus controls charging of a vehicle, according to an embodiment of the present disclosure.

In operation 105, the vehicle control apparatus may receive information about the fact that charging of a first vehicle is started. In this specification, the first vehicle may refer to another electric vehicle that starts charging first through a charger provided in a charging station for charging vehicles. The vehicle control apparatus may receive a notification indicating that charging is first started at the first vehicle from a communication module of the charger.

In operation no, the vehicle control apparatus may detect the connection of a charging cable to the second vehicle. In this specification, a second vehicle may refer to a vehicle to which embodiments of the present disclosure are applied.

The user of the second vehicle may physically connect a charging cable of the charger to a charging terminal of the second vehicle. The vehicle control apparatus may detect that the charging cable is physically connected to the second vehicle.

In operation 115, the vehicle control apparatus may recognize that the charging cable is connected in the second vehicle. The vehicle control apparatus may recognize that the second vehicle is ready to receive power through the charging cable.

In operation 120, the vehicle control apparatus may receive a waiting time of the second vehicle and may perform a preliminary control of the second vehicle in accordance with a charging end time of the first vehicle. The waiting time of the second vehicle may be a time remaining until charging of the second vehicle is started. The waiting time of the second vehicle may be determined depending on a charging end time of the first vehicle. The vehicle control apparatus may receive the charging end time of the first vehicle and the waiting time of the second vehicle from the communication module of the charger. The vehicle control apparatus may wait for the charging in a state in which the charging cable is connected to the vehicle.

The vehicle control apparatus may perform the preliminary control of the second vehicle in accordance with the charging end time of the first vehicle. The vehicle control apparatus may perform pre-conditioning of the second vehicle in accordance with the charging end time of the first vehicle. The pre-conditioning may include an operation of controlling a state of a vehicle battery to be suitable for charging. The pre-conditioning may include an operation of increasing a charging performance of the vehicle battery. The vehicle control apparatus may predict that charging of the second vehicle will start at the charging end time of the first vehicle and may control the battery of the second vehicle to be suitable for charging.

The vehicle control apparatus may increase the temperature of the battery of the second vehicle up to a temperature in a state in which a vehicle's ignition is turned on (IG On) in accordance with the charging end time of the first vehicle as an operation included in the preliminary control of the second vehicle. When the vehicle waits until the charging of another electric vehicle is ended to charge the vehicle, a long time may elapse with the vehicle's ignition turned off (IG Off). When a long time elapses in the state in which the vehicle's ignition is turned off, the temperature of the vehicle battery may decrease. When the temperature of the vehicle battery decreases, the charging performance of the vehicle battery may decrease, so that the time for charging the vehicle may increase. The vehicle control apparatus may predict that charging of the second vehicle will start at the charging end time of the first vehicle and may control the temperature of the battery of the second vehicle to a temperature suitable for charging.

In operation 125, the vehicle control apparatus may receive a notification from the charger when charging of the first vehicle is ended and may start the charging. The vehicle control apparatus may receive the notification indicating that charging of the first vehicle is ended from the communication module of the charger. The vehicle control apparatus may switch the second vehicle to a state in which the battery is charged in response to receiving the notification that the charging of the first vehicle is ended. After receiving the notification that the charging of the first vehicle is ended, the vehicle control apparatus may allow the power flowing from the charger to flow into the battery.

In operation 130, the vehicle control apparatus may receive charging information including a charging time, a charge, and a drivable distance. The vehicle control apparatus may receive the charging information transmitted by the charger to the second vehicle. The charging information transmitted to the second vehicle may be transmitted to the second vehicle, to a user's portable device of the second vehicle, or to both receiving entities. For example, the charging information transmitted to the second vehicle may be transmitted to the vehicle control apparatus of the second vehicle, may be transmitted to a mobile phone of the user of the second vehicle, or may be transmitted to both the vehicle control apparatus and the mobile phone.

The charging information may be transmitted periodically to and may be received periodically from the vehicle control apparatus. The charging information may be transmitted from and received by the vehicle control apparatus without a user's request. The user who has checked the charging information may determine whether to stop charging every time.

The charging information may include the charging time, the charge, and the drivable distance. The charging time may mean a time taken while charging is currently in progress. The charge may mean a cost according to the current charging. The drivable distance may mean a drivable distance of the second vehicle after charging.

In operation 135, the vehicle control apparatus may recognize a request to stop charging in the second vehicle. The vehicle control apparatus may recognize that the user of the second vehicle requests to stop charging. The vehicle control apparatus may recognize that the charger requests to stop charging of the second vehicle. When it is recognized that the request to stop charging occurs in operation 135, the vehicle control apparatus may proceed to operation 155 to immediately end charging.

The vehicle control apparatus may determine whether a stop command for executing the charging stop request in operation 135 is performed based on the current vehicle information. The vehicle information may include a time, a charge, and a remaining distance.

When an urgent situation occurs in which charging should be stopped, the user may give a stop command to stop charging regardless of vehicle information. The stop command may be transmitted to the control apparatus of the second vehicle, the charging station where the charger is provided, or both receiving objects. The user may transmit the stop command using a vehicle control apparatus of the second vehicle or a portable device such as a mobile phone carried by the user. Therefore, the present disclosure is not limited to sequentially transmitting the stop command after receiving the charging information in operation 130 as illustrated in FIG. 1, and may transmit the stop command to stop charging according to an independent command system regardless of operation 130.

In operation 140, the vehicle control apparatus may recognize that the charging in the second vehicle is ended. The vehicle control apparatus may detect that a capacity of the battery of the second vehicle reaches the maximum capacity. The vehicle control apparatus may receive a notification indicating that the charging of the battery of the second vehicle is completed from the charger. When it is recognized that charging in the second vehicle is ended in operation 140, the vehicle control apparatus may proceed to operation 150 to receive a charging end notification, and may proceed to operation 155 to end charging.

In operation 145, the vehicle control apparatus may recognize that the additional charging vehicle does not exist.

The vehicle control apparatus may receive information from the charger that there are no more vehicles charging additionally. When it is recognized that the additional charging vehicle does not exist in operation 145, the vehicle control apparatus may proceed to operation 150 to receive the charging end notification, and may proceed to operation 155 to end charging.

In operation 160, the vehicle control apparatus may calculate a time taken until final charging in the second vehicle, a charged charge, and a drivable distance after charging. The vehicle control apparatus may receive vehicle information including the time taken until final charging, the charged charge, and the driving distance after charging from the charger. The vehicle control apparatus may display the received vehicle information on a display unit (e.g., a display of an instrument panel or a navigation system) of the vehicle.

Figure 2:
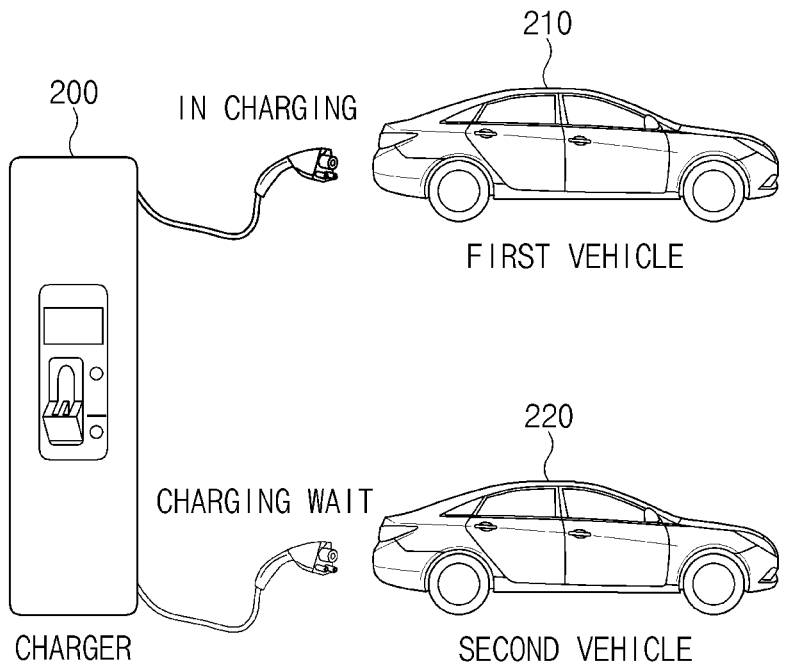
FIG. 2 is a diagram illustrating a vehicle charging system according to an embodiment of the present disclosure.

FIG. 2 is a diagram illustrating a vehicle charging system according to an embodiment of the present disclosure.

A charger 200 may be provided at the charging station of an electric vehicle. The charger 200 may supply power to the electric vehicle through a charging cable. The charger 200 may be a power supply device such as an electric pit (E-Pit).

The charger 200 may include a plurality of charging cables. The charging cable may be a charging outlet that may be connected to a charging terminal of an electric vehicle. For example, two charging cables may be installed per one charger 200 provided in the charging station. However, the present disclosure is not limited thereto, and two or more charging cables may be installed per one charger 200 provided in the charging station.

Any one of the plurality of charging cables of the charger 200 may be connected to a first vehicle 210. Another one of the plurality of charging cables of the charger 200 may be connected to a second vehicle 220.

When the first vehicle 210 arrives at the charging station first, the first vehicle 210 may be connected to any one of the plurality of charging cables of the charger 200 first. When the first vehicle 210 arrives at the charging station first, charging of the first vehicle 210 may be started first. After the first vehicle 210 is connected to the charging cable of the charger 200 or while the first vehicle 210 is being charged, the second vehicle 220 may arrive at the charging station.

When the second vehicle 220 arrives at the charging station after the first vehicle 210 is connected to the charging cable of the charger 200 or while the first vehicle 210 is being charged, another one of the plurality of charging cables of the charger 200 may be connected to the second vehicle 220.

When the another one of the plurality of charging cables of the charger 200 is connected to the second vehicle 220 while the first vehicle 210 is being charged, the charger 200 may exclusively charge the first vehicle 210. When the another one of the plurality of charging cables of the charger 200 is connected to the second vehicle 220 while the first vehicle 210 is being charged, the charger 200 may withhold charging of the second vehicle 220. When the another one of the plurality of charging cables of the charger 200 is connected to the second vehicle 220 while the first vehicle 210 is being charged, the charger 200 may block an output of power to the charging cable connected to the second vehicle 220.

When power is simultaneously output from the plurality of charging cables, charging power is divided into vehicles connected to each of the plurality of charging cables, so that the charging speed of the first vehicle 210 may decrease. When the first vehicle 210 is charging, the charger 200 may exclusively charge the battery of the first vehicle 210 to charge the first vehicle 210 with charging power of a specified capacity regardless of connecting the charging cable to the second vehicle 220. Accordingly, it is possible to prevent an increase in the charging time of the first vehicle 210 that arrives at the charging station first and is charged first.

Based on the charging end time of the first vehicle 210, before a specific point in time, the charger 200 may perform the preliminary control on the second vehicle 220 waiting to be charged while being connected to the charging cable. The charger 200 may perform the preliminary control of the second vehicle in accordance with the charging end time of the first vehicle 210. The charger 200 may transmit the charging end time of the first vehicle 210 and the waiting time of the second vehicle 220 to the second vehicle 220, and may determine a start time of the preliminary control of the second vehicle 220.

The charger 200 may perform the preliminary control with respect to the second vehicle in accordance with the charging end time of the first vehicle 210. The charger 200 may perform pre-conditioning of the second vehicle 220 in accordance with the charging end time of the first vehicle. The charger 200 may control the state of the battery of the second vehicle 220 to be suitable for charging through the pre-conditioning. The charger 200 may increase the charging performance of the battery of the second vehicle 220 through the pre-conditioning. The charger 200 may control the battery of the second vehicle 220 to be suitable for charging when the charging of the first vehicle is finished and the charging of the second vehicle is started through the pre-conditioning.

The charger 200 may increase the temperature of the battery of the second vehicle 220 up to a temperature in a state in which the vehicle's ignition is turned on (IG On) in accordance with the charging end time of the first vehicle 210. When the second vehicle 220 waits until the charging of another electric vehicle is ended to perform charging, a long time may elapse in the state in which the vehicle's ignition is turned off (IG Off). When a long time elapses in the state in which the vehicle's ignition of the second vehicle 220 is turned off, the temperature of the battery of the second vehicle 220 may decrease. When the temperature of the battery of the second vehicle 220 decreases, the charging performance of the battery may decrease, so that the charging time of the second vehicle 220 may increase. The charger 200 may predict that charging of the second vehicle 220 will start at the charging end time of the first vehicle 210, and may control the temperature of the battery of the second vehicle 220 to a temperature suitable for charging.

Figure 3:
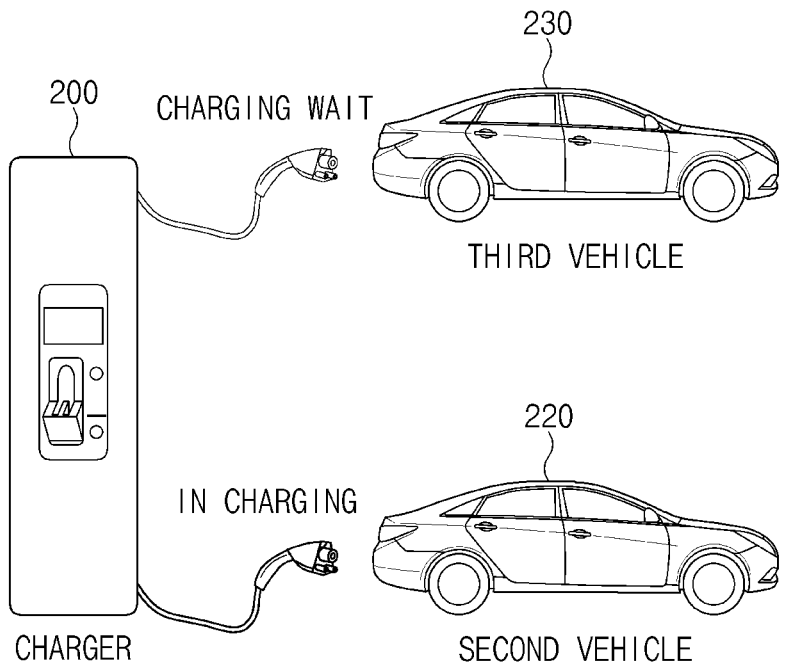
FIG. 3 is a diagram illustrating a vehicle charging system according to an embodiment of the present disclosure.

FIG. 3 is a diagram illustrating a vehicle charging system according to an embodiment of the present disclosure.

When the charging of the first vehicle 210 is ended, the charger 200 may transmit a notification indicating that the charging of the first vehicle 210 is ended to the second vehicle 220. The second vehicle 220 may receive a notification indicating that the charging of the first vehicle 210 is ended through a connectivity service such as Blue Link™ or UVO™.

When charging of the first vehicle 210 is ended, the charger 200 may start charging the second vehicle 220. When charging of the first vehicle 210 is ended, the charger 200 may start supplying power through the charging cable connected to the second vehicle 220. When charging of the first vehicle 210 is ended, the charger 200 may charge the second vehicle 220 without a separate delay time. When the second vehicle 220 does not use the connectivity service, the charger 200 may omit a separate notification and immediately start charging the second vehicle 220.

When a third vehicle 230 arrives at the charging station while the second vehicle 220 is being charged, the charging cable connected to the first vehicle 210 or another charging cable provided in the charger 200 may be connected to the third vehicle 230. The third vehicle 230 may wait until charging of the second vehicle 220 is ended.

Figure 4:
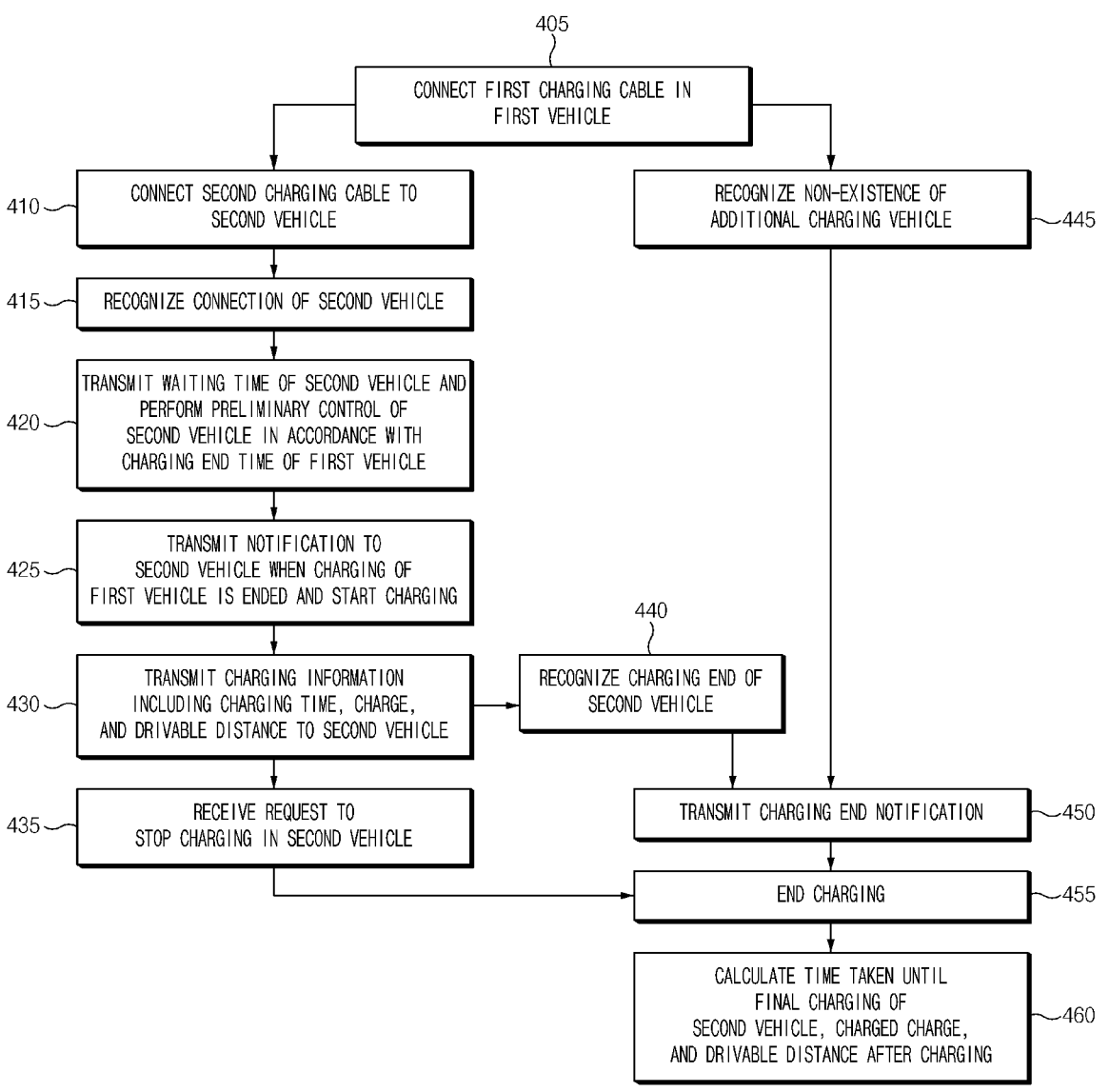
FIG. 4 is a flowchart illustrating how a vehicle charging system controls charging of a vehicle, according to an embodiment of the present disclosure.

FIG. 4 is a flowchart illustrating how a vehicle charging system controls charging of a vehicle, according to an embodiment of the present disclosure.

In operation 405, the first charging cable may be connected to the first vehicle. The first vehicle may arrive at the charging station first to connect the first vehicle to the charger. The first charging cable of the charger may be physically connected to the first vehicle to connect the first vehicle to the charger.

In operation 410, the second charging cable may be connected to the second vehicle. The charger may have the plurality of charging cables. When the second vehicle arrives at the charging station after the first vehicle is connected to the first charging cable, the second vehicle may be connected to the second charging cable of the charger.

In operation 415, the charger and the second vehicle may recognize the connection of the second vehicle. The charger may recognize that the second vehicle is connected to the second charging cable after the first vehicle is connected to the first charging cable. When the second vehicle is connected to the charger, the vehicle control apparatus of the second vehicle may recognize that there is a previously connected vehicle.

In operation 420, the charger may transmit a waiting time of the second vehicle and may perform the preliminary control of the second vehicle in accordance with a charging end time of the first vehicle. The charger may transmit the charging end time of the first vehicle and the waiting time of the second vehicle to the second vehicle. The charger and/or the vehicle control apparatus of the second vehicle may perform the preliminary control of the second vehicle in accordance with the charging end time of the first vehicle.

The charger and/or the vehicle control apparatus of the second vehicle may perform the preliminary control of the second vehicle in accordance with the charging end time of the first vehicle. The vehicle control apparatus may perform pre-conditioning of the second vehicle in accordance with the charging end time of the first vehicle. The pre-conditioning may include an operation of controlling a state of a vehicle battery to be suitable for charging. The pre-conditioning may include an operation of increasing a charging performance of the vehicle battery. The charger and/or the vehicle control apparatus of the second vehicle may predict that charging of the second vehicle will start at the charging end time of the first vehicle and may control the battery of the second vehicle to be suitable for charging.

The charger and/or the vehicle control apparatus of the second vehicle may increase the temperature of the battery of the second vehicle up to a temperature in a state in which the vehicle's ignition is turned on (IG On) in accordance with the charging end time of the first vehicle. In addition, when the vehicle waits until the charging of another electric vehicle is ended to charge the vehicle, a long time may elapse in the state in which the vehicle's ignition is turned off (IG Off). When a long time elapses in the state in which the vehicle's ignition is turned off, the temperature of the vehicle battery may decrease. When the temperature of the vehicle battery decreases, the charging performance of the vehicle battery may decrease, so that the time for charging the vehicle may increase. The charger and/or the vehicle control apparatus of the second vehicle may predict that charging of the second vehicle will start at the charging end time of the first vehicle and may control the battery of the second vehicle to a temperature suitable for charging.

In operation 425, when charging of the first vehicle is ended, a notification may be sent to the second vehicle and charging may be started. The charger may send the notification indicating that the charging of the first vehicle is ended. The vehicle control apparatus may switch the second vehicle to a state in which the battery is charged in response to receiving the notification indicating that the charging of the first vehicle is ended. The charger may supply power to the second vehicle after sending the notification indicating that the charging of the first vehicle is ended.

In operation 430, charging information including a charging time, a charge, and a drivable distance may be transmitted. The charger may transmit the charging information to the second vehicle. The charging information transmitted to the second vehicle by the charger may be transmitted to the second vehicle, to a user's portable device of the second vehicle, or to both receiving objects. For example, the charger may transmit the charging information transmitted to the second vehicle to the vehicle control apparatus of the second vehicle, to a mobile phone of the user of the second vehicle, or to both the vehicle control apparatus and the mobile phone.

The charger may periodically transmit the charging information. The charging information may be transmitted from the charger and may be received to the vehicle control apparatus without a user's request. The user who has checked the charging information may determine whether to stop charging every time.

The charging information may include the charging time, the charge, and the drivable distance. The charging time may mean a time taken while charging is currently in progress. The charge may mean a cost according to the current charging. The drivable distance may mean a drivable distance of the second vehicle after charging.

In operation 435, a charging stop request may be received from the second vehicle. The user of the second vehicle may input the charging stop request to the vehicle control apparatus of the second vehicle to stop charging. The charger may receive the charging stop request to stop charging of the second vehicle. When the charger receives the charging stop request in operation 435, the charger may proceed to operation 455 to immediately end charging.

The vehicle control apparatus may determine whether a stop command for executing the charging stop request in operation 435 is performed based on the current vehicle information. The vehicle information may include a time, a charge, and a remaining distance.

When an urgent situation occurs in which charging should be stopped, the user may give a stop command to stop charging regardless of vehicle information. The stop command may be transmitted to the control apparatus of the second vehicle, the charging station where the charger is provided, or both receiving objects. The user may transmit the stop command using a vehicle control apparatus of the second vehicle or a portable device such as a mobile phone carried by the user. Therefore, the present disclosure is not limited to sequentially transmitting the stop command after the charger transmits the charging information in operation 430 as illustrated in FIG. 4, and may receive the stop command to stop charging according to an independent command system regardless of operation 430.

In operation 440, it may be recognized that charging of the second vehicle is ended. The charger and/or the vehicle control apparatus of the second vehicle may detect that the capacity of the battery of the second vehicle reaches the maximum capacity. The charger may transmit a notification indicating that charging of the battery of the second vehicle is completed. When it is recognized that charging in the second vehicle is ended in operation 440, the charger may transmit the charging end notification to the second vehicle in operation 450, and proceed to operation 455 to end charging.

In operation 445, it may be recognized that the additional charging vehicle does not exist. The charger and/or the vehicle control apparatus of the second vehicle may obtain information from the charger that there is no more vehicles charging additionally. When it is recognized that the additional charging vehicle does not exist in operation 445, the charger may transmit the charging end notification to the second vehicle in operation 450, and may proceed to operation 455 to end charging.

In operation 460, a time taken until the final charging of the second vehicle, a charged charge, and a drivable distance after charging may be calculated. The charger may transmit the vehicle information including the time taken until final charging, the charged charge, and the driving distance after charging to the vehicle. The charger may display the vehicle information on a display unit (e.g., a display for displaying charging progress) of the charger.

Figure 5:
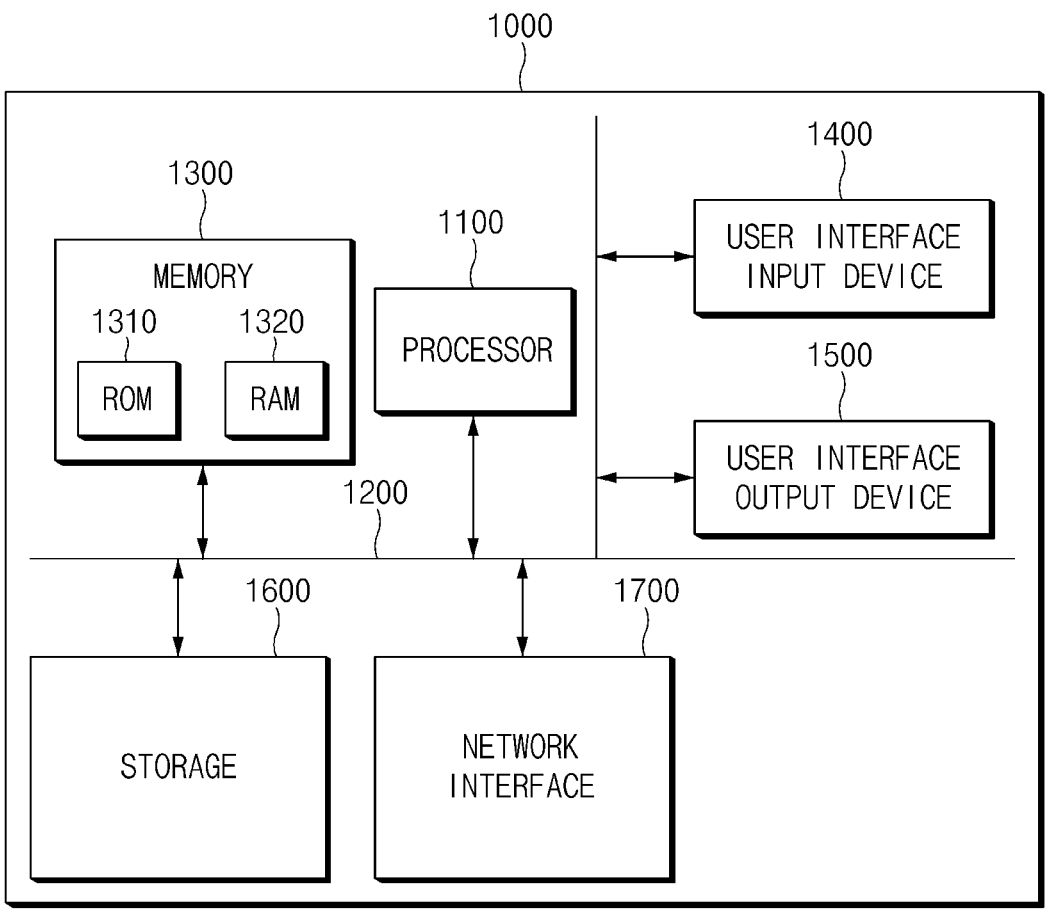
FIG. 5 illustrates a computing system according to an embodiment of the present disclosure.

FIG. 5 illustrates a computing system according to an embodiment of the present disclosure.

Referring to FIG. 5, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the memory 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

Embodiments of the present disclosure may allow a vehicle to be physically connected to a charger while another electric vehicle is being charged. Accordingly, embodiments of the present disclosure may allow the charging of the vehicle to start automatically when the charging of another electric vehicle is ended, thereby reducing the waiting time for charging the vehicle.

In addition, embodiments of the present disclosure may control a state of the vehicle battery of the vehicle while charging another electric vehicle to be suitable for charging. Accordingly, embodiments of the present disclosure may increase the charging performance of the vehicle battery of the vehicle at the time when the charging of another electric vehicle is ended, thereby reducing the time for charging the vehicle.

Besides, a variety of effects directly or indirectly understood through this disclosure may be provided.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A vehicle control apparatus comprising:
a memory;
a network interface; and
a processor configured to:
recognize that a charging cable is connected to a vehicle;
receive a charging end time of a preceding vehicle and a waiting time until a charging of the vehicle starts;
wait for starting the charging in case the charging cable is connected to the vehicle;
perform pre-conditioning by increasing a temperature of a vehicle battery of the vehicle up to a temperature in case an ignition of the vehicle is turned on and based on receiving the waiting time;
stop performing the pre-conditioning at the charging end time of the preceding vehicle; and
allow starting of the charging at the charging end time in case the charging cable is connected to the vehicle.

2. The vehicle control apparatus of claim 1, wherein the processor is configured to receive a notification at the charging end time.

3. The vehicle control apparatus of claim 1, wherein the processor is configured to receive vehicle information for the vehicle including a charging time, a charge, and a drivable distance at a time when the charging starts or at a time when the charging ends.

4. The vehicle control apparatus of claim 3, wherein the processor is configured to receive a stop command indicating to stop the charging of the vehicle from a user irrespective of receiving the vehicle information.

5. The vehicle control apparatus of claim 3, wherein the processor is configured to transmit the vehicle information to a portable device of a user.

6. The vehicle control apparatus of claim 1, wherein the processor is configured to receive the charging end time and the waiting time from a communication module of a charger through the network interface.

7. The vehicle control apparatus of claim 1, wherein the processor is configured to display vehicle information on a display unit of the vehicle, wherein the display unit comprises a display of an instrument panel or a navigation system.

8. The vehicle control apparatus of claim 1, wherein the processor is configured to receive a stop command indicating to stop the charging of the vehicle from a user.

9. The vehicle control apparatus of claim 1, wherein the processor is configured to
determine that a capacity of the vehicle battery of the vehicle reached a maximum capacity; and
recognize that the charging of the vehicle ended.

10. A method for controlling charging of a vehicle, the method comprising:
recognizing that a charging cable is connected to the vehicle;
receiving a charging end time of a preceding vehicle and a waiting time until a charging of the vehicle starts;
waiting for starting the charging of the vehicle in case the charging cable is connected to the vehicle;
performing pre-conditioning by increasing a temperature of a vehicle battery of the vehicle up to a temperature in case an ignition of the vehicle is turned on;
stopping performing preconditioning at the charging end time of the preceding vehicle; and
allowing starting of the charging of the vehicle at the charging end time in case the charging cable is connected to the vehicle.

11. The method of claim 10, wherein starting the charging includes receiving a notification at the charging end time.

12. The method of claim 10, further comprising receiving vehicle information for the vehicle including a charging time, a charge, and a drivable distance at a time when the charging starts or at a time when the charging ends.

13. The method of claim 12, further comprising receiving a stop command indicating to stop the charging of the vehicle from a user irrespective of receiving the vehicle information.

14. The method of claim 12, further comprising transmitting the vehicle information to a portable device of a user.

15. A system comprising:
a charger including a plurality of charging cables, wherein the charger is configured to:
proceed with a charging of a first vehicle of a plurality of vehicles in case a first charging cable of the plurality of charging cables is connected to the first vehicle;
allow a second charging cable of the plurality of charging cables to be connected to a second vehicle of the plurality of vehicles while the charging the first vehicle is carried out;
transmit a charging end time of the first vehicle and a waiting time until a charging starts to the second vehicle; and
wait to charge the second vehicle in case the second charging cable is connected to the second vehicle; and
the second vehicle having a vehicle control apparatus comprising a processor, wherein the processor is configured to:
perform pre-conditioning by increasing a temperature of a vehicle battery of the second vehicle up to a temperature in case an ignition of the second vehicle is turned on and based on receiving the waiting time; and stop performing the pre-conditioning at the charging
    end time of the first vehicle,
    wherein the charger is further configured to start the
        charging of the second vehicle at the charging end
        time of the first vehicle in case the second charging
        cable is connected to the second vehicle.

16. The system of claim 15, wherein the charger is configured to exclusively charge the first vehicle during the charging of the first vehicle.

17. The system of claim 15, wherein the charger is configured to transmit a notification to the second vehicle at the charging end time of the first vehicle.

18. The system of claim 15, wherein the charger is configured to transmit vehicle information of the second vehicle including a charging time, a charge, and a drivable distance at a time when the charging of the second vehicle starts or at a time when the charging of the first vehicle ends.

19. The system of claim 18, wherein the charger is configured to receive a stop command indicating to stop the charging of the second vehicle from a user irrespective of a transmission of the vehicle information.

20. The system of claim 15, wherein the charger and the processor are configured to receive a stop command indicating to stop the charging of the second vehicle from a user.

* * * * *